April 14, 1964 V. HECHLER IV 3,129,408

ELECTRONIC COMMUTATOR

Filed Sept. 19, 1960 2 Sheets-Sheet 1

INVENTOR:
VALENTINE HECHLER IV
BY
Watson D. Harbaugh
ATT'Y

ELECTRONIC COMMUTATOR

Filed Sept. 19, 1960 2 Sheets-Sheet 2

INVENTOR:
VALENTINE HECHLER IV
BY
Watson D. Harbaugh
ATT'Y 3,129,408
Patented Apr. 14, 1964

3,129,408

ELECTRONIC COMMUTATOR

Valentine Hechler IV, Northfield, Ill., assignor to Webcor, Inc., Chicago, Ill., a corporation of Illinois Filed Sept. 19, 1960, Ser. No. 56,783
15 Claims. (Cl. 340—166)

This invention relates to a new and useful improvement in an electronic commutator and more particularly to an electronic commutator that has a common output.

An object of my invention is in the provision in a commutator of this character that does not employ mechanical apparatuses that generate noise or electrical interference which is commonly found in mechanical commutators.

A further object of my invention is in an electronic commutator that has no apparent prescribed limit on its speed of operation and is of a device that is easily controlled with respect to the commencing and selectively terminating the operation thereof.

A still further object of my invention is in the provision of an electronic commutator of this type which does not include and is not controlled by a coil device, an electric motor or any appreciable moving parts which are subject to wear.

Other objects will appear hereinafter.

The invention consists in the novel combination and arrangement of parts to be hereinafter described and claimed.

The invention will be best understood by reference to the accompanying drawings showing the preferred form of construction, and in which like numerals and like symbols refer to like parts:

The invention disclosed by this application finds its use in digital commutators or in multiplex communications. This system permits an unlimited number of electrical output pulses to be selectively transmitted.

Figure 1:
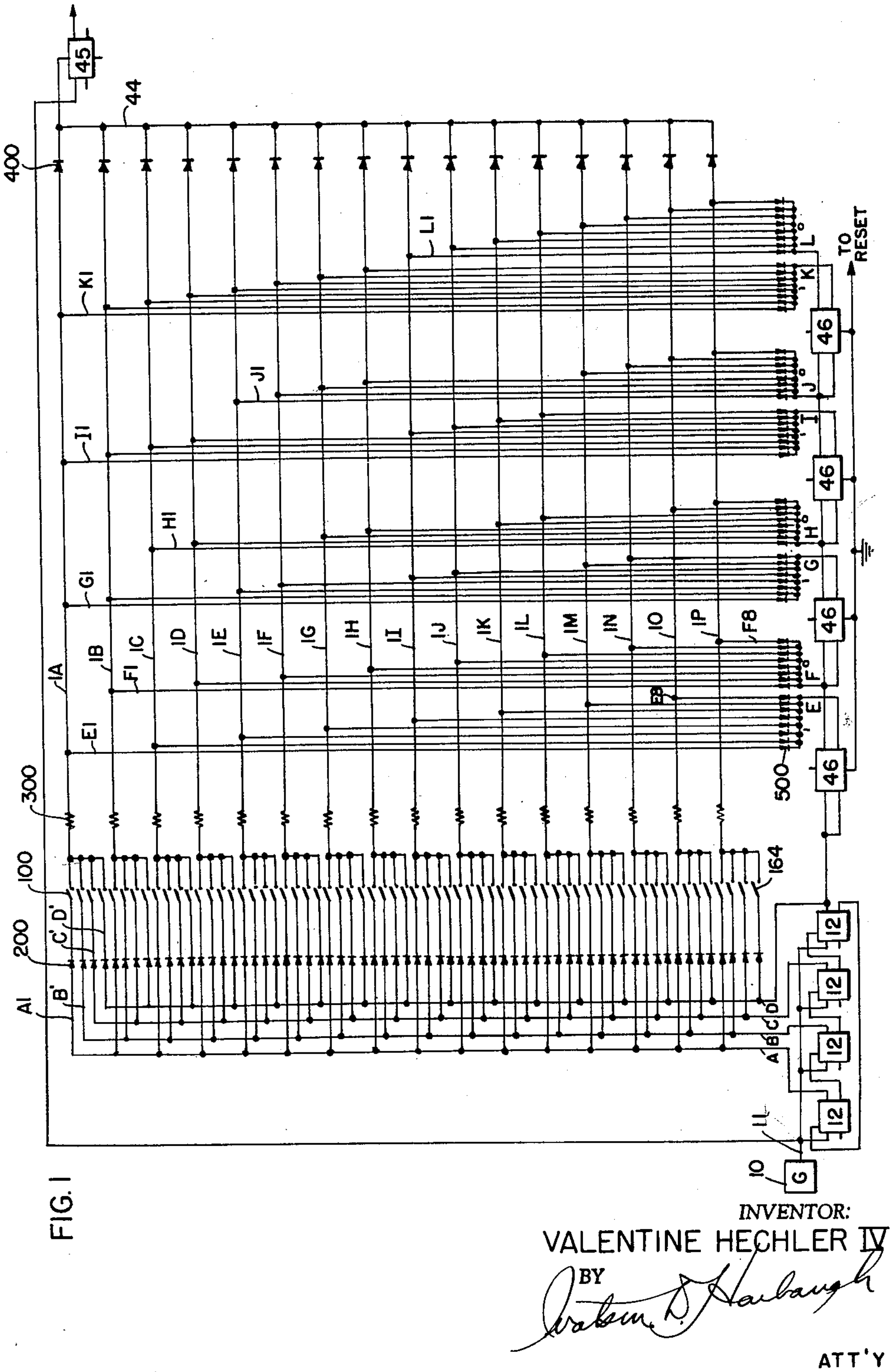
FIG. 1 is a schematic diagram showing the electric circuit of my electronic commutator.

Referring to FIG. 1 there is schematically shown a rectangular matrix comprising a series of network lines providing a plurality of commutating coordinates. The block symbol indicated as 10 generates or transmits a pulse train which can be regular or irregular without affecting the operation of the device. The pulse train is transmitted over conduit 11 to the first of a series of flip-flop referred to herein as ring counters 12. These ring counters 12 consist of an arrangement of electronic elements which comprise a circuit divider.

Figure 3:
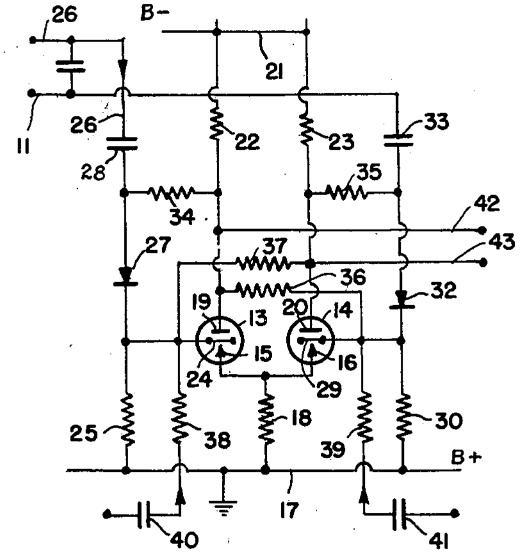
FIG. 3 is a fragmentary schematic wiring diagram of the basic flip-flop circuit employed in my invention.

The divider circuit of the ring counters 12 is schematically shown in FIG. 3. This circuit includes a pair of transistor 13 and 14 each having their respective emitters 15 and 16 tied together and connected to a ground 17 through a resistance 18. The collectors 19 and 20 of their respective transistors are connected to a B— power line

21 through load resistors 22 and 23. The base 24 of transistor 13 is grounded through resistance 25 and is also connected to the input line 26 through the rectifier 27 and capacitor 28. In a similar manner the base 29 of transistor 14 is grounded through resistor 30 and is connected to the input line 11 through the rectifier 32 and capacitor 33. A B— voltage is applied to each of the respective bases 24 and 29 through the dropping resistors 34 and 35 which may be connected thereto through the rectifiers and if desired through the load resistors 22 and 23.

Figure 2:
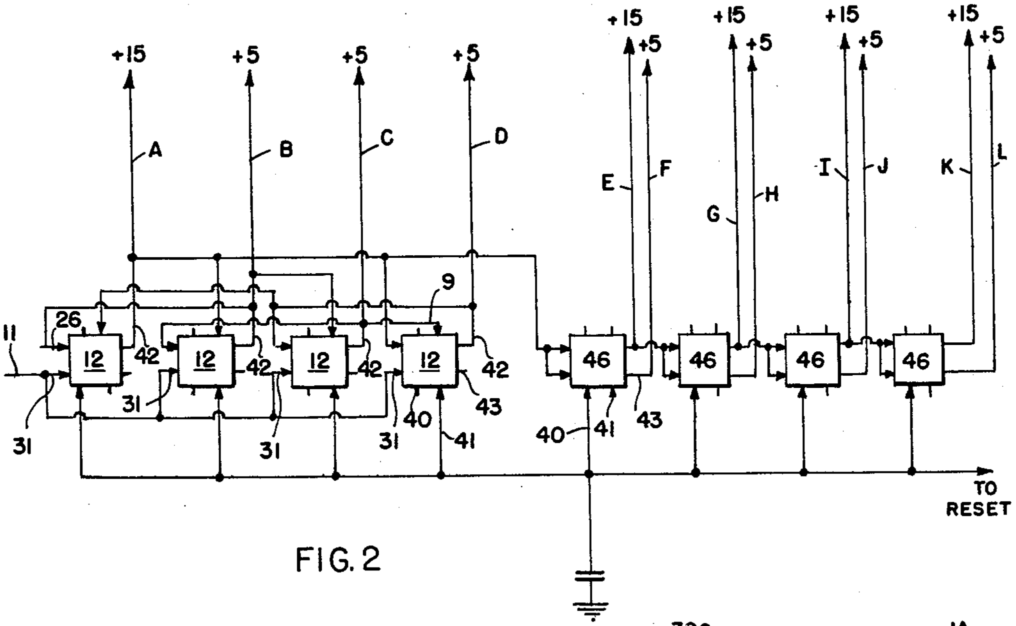
FIG. 2 is a fragmentary schematic view showing certain portions of the electric circuit in an enlarged scale.

The collector 19 is tied to the base 29 of the transistor 14 through resistor 36 and in a corresponding manner the collector 20 is tied to the base 24 of transistor 13 through resistor 37. Also the respective bases 24 and 29 for conventional pulse reset purposes may be additionally connected to the power line 21 through a reset device (not shown) as shown in FIG. 2 and through resistors 38 and 39 and capacitors 40 and 41 respectively to the collectors 19 and 20 of transistors 13 and 14. It will be observed that the Reset simultaneously pulses all bases 29 in the binary counters 46 and in the ring counter 12 connected to line A, while the bases 19 are pulsed in the remaining ring counters 12 to return the system to an initial state. The output of the divider circuit appears on the lines 42 and 43. The circuit has two stable steps, in one of which the transistor 13 conducts and the transistor 14 is cut off and vice-versa. The state of the circuit can be shifted from one to the other of these conditions by the application of appropriate input pulses thereto.

As shown in FIG. 1, I have connected together in a series a plurality of the ring counters 12. In such series the ring counters 12 comprise a sequential network that will divide the sum of the pulses generated or transmitted thereto by the unit 10. Each divider circuit of each ring counter 12 will change its state with each pulse coming in and pass along down the ring the pulses received so that in the shown schematic circuit of FIG. 1, the pulses of the last ring counter 12 will be ⅛ the number of pulses generated or transmitted by the unit 10. It is the purpose of these ring counters 12 as flip flops, each biased by a preceding one, to divide and vary the values of the input pulses and selectively transmit the same between the series of vertical lines A, B, C and D. As can be seen in FIG. 3, each of these lines are singly connected to one of the output lines of the divider circuit such as line 42. The other output line 43 of the divider circuit being connected to the input of the next succeeding ring counter 12.

The vertical lines A, B, C and D each terminate into a set of horizontal grouping lines A′, B′, C′ and D′. Each set of the grouping lines are in turn connected to a network of horizontal output lines. As can be seen from FIG. 1 there is employed sixteen sets of horizontal grouping lines A′, B′, C′ and D′ which in turn are each connected to an individual output line 1A to 16A. Each of the grouped horizontal lines A′, B′, C′ and D′ include therein a manually operated switch 100—164. Each of the lines A′–D′ in each of the sixteen sets also include a diode 200 the purpose and operation of which will be hereinafter made apparent. Each of the output lines 1A–16A include a resistor 300 and a second diode 400. Each of the horizontal output lines 1A–16A are connected to an output line 44 which is in turn connected to an output gate 45.

Referring to FIG. 2 there is schematically shown a series of binary units 46. Each of the binary units 46 consists of a unit operating as a flip flop as heretofore described so that each binary unit is conditioned by the previous binary unit with the first of the binary units 46 being adapted to receive an initial actuating pulse from the last of the ring counters 12. Each of the binary units has a dual output. The output lines of the first binary unit being designated at E and F. The output lines of the second unit being designated as G and H. The output lines of the three binary units being designated I and J, and the last output lines of the last unit being designated as K and L.

Referring back to FIG. 1 it is noted that each of the output lines of each binary unit is in turn connected to a series of eight vertical lines. The eight vertical lines of the output E of the first binary unit being designated E–1 through E–8 and the eight vertical lines of the F output line being designated F–1 through F–8, each of the succeeding groups of eight vertical lines of each of the succeeding output lines G through L being likewise designated. It should be noted that the vertical lines of each of the groups E, G, I and K are each connected to the output lines 1A, 1C, 1E, 1G, 1I, 1K, 1M and 1O. While each of the lines of the outputs F, H, J and L are each in turn connected to the horizontal output lines 1B, 1D, 1F, 1H, 1J, 1N and 1P. Each vertical line of each group has positioned therein a diode 500 the purpose and function of which will hereinafter be made apparent.

The apparatus of this invention is designed to have one output carrying a modified pulse pattern resulting from a single input supplying a multiplicity of pulses of a set pattern. The apparatus and circuitry is so designed and the elements so arranged that only upon a certain set of conditions within the apparatus will a single output be produced. By the association of the ring counters 12 with the vertical lines A, B, C and D thereof it is arranged that these four lines commutate continuously and therefore the condition thereof will sequentially change. Let us assume for the sake of description that a pulse train capable of firing the counter 12 is emitted from the unit 10. By the circuitry shown in FIG. 3 and heretofore described line A will have a plus 15 pulse (representing a binary one) while lines B, C and D will have a plus 5 pulse. As the next status (representing a binary zero) of the pulse train is transmitted from the unit 10 into the ring counter 12 the state of voltages on the lines A, B, C and D will commutate and as a result thereof this pulse will result in line B having a voltage of plus 15 thereon while lines A, C and D will have a plus 5 voltage thereon.

Being bistable devices the binary counters 46 are inherently capable of developing two distinct outputs. For the sake of description herein one output will be arbitrarily noted as the "1" output; the other is noted as the "0" output. It should be remembered however that a given output is produced only once for every two input signals and therefore either one of the outputs may be employed to produce a desired result.

Figure 4:
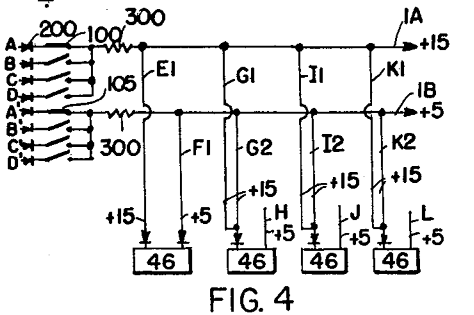
FIG. 4 is a fragmentary schematic wiring diagram of a portion of the electric circuit of my commutator showing certain portions thereof in actuated condition.

For a description of the operation of the apparatus let us assume the following facts. The pulse introduced into the ring counters 12 has resulted in the A line being plus 15 and the B, C and D lines plus 5. Referring to FIG. 4, it is shown that manual switches 100 and 105 are closed. Let us further assume that the "1" output of the binary counters likewise constitute a plus 15 and the "0" outputs constitute a plus 5. The plus 15 of line A will appear through the diode 200, closed switch 100, the resistor 300 in line 1A, past the diode 400 upon the output line 44 and the gate 45 because there is no negative point to hold that voltage to plus 5 volts. A plus 15 was also present on the vertical lines E1, G1, I1 and K1 and therefore did not prevent the plus 15 from appearing upon the gate 45. This result was achieved through the inherent characteristics of the diodes that were found in the circuitry. It is fundamental that a diode will allow electrical current to flow in only one direction. Current will flow from a source of higher positive voltage to a source of lower positive voltage but not in the opposite thereof. Therefore the only condition which will permit an output of plus 15 to appear on the output is when the A line provides the voltage and the lines E1, G1, I1, and K1 do not change the plus 15 volt potential.

Retaining the above assumed facts it is clear then that the "0" output on lines F, H, J and L will appear upon the other sides of the respective diodes 400 located in the horizontal output lines into the output line 44 because of the inherent characteristics of the diode which prevents the passing of current from a lower positive voltage on one side (plus 5 from the "0" output lines) to a higher positive voltage on the other side of the diode (plus 15 which appeared on line A, closed switch 100, line 1A, diode 400 and to output line 44).

Referring to FIG. 4, it is noted that when the manual switch 105 is closed and with the state of voltage upon line A a plus 15, this voltage will appear through line A' and through the closed switch 105 to the resistor 300 in line 1B. Preventing this voltage appearing on the other side of the resistor 300 is the relative negative voltage of plus 5 effectively placed on this line 1B by the first binary counter 46 through one of the diodes 500.

Figure 5:
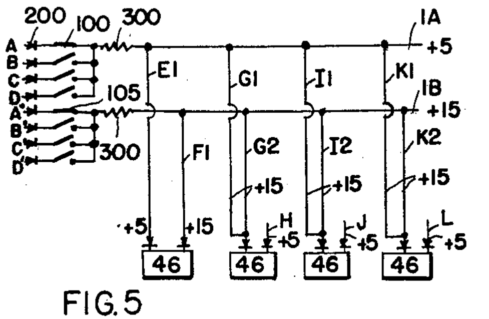
FIG. 5 is a fragmentary schematic wiring diagram similar to FIG. 4 but showing certain operational changes thereof.

Referring to FIG. 5, I have schematically shown the circuitry and operation of the elements thereof resulting from the fourth pulse emitted from the unit 10. In the circuit diagram manual switches 100 and 105 are closed. The plus 15 on line A will thereby be imposed upon the diodes 200 and closed switches 100 and 105. However, the fourth pulse has changed the state of voltage of the first binary counter 46. In its changed state, line E1 thereof now possesses a plus 5 and line L1 now possesses a plus 15. Therefore, from the foregoing description the output on line 1B will now be plus 15 while the output on line 1A will be a plus 5. The same sequential operation follows throughout all the binary counters 46.

It is then apparent that I have provided a plurality of ring counters 12 each connected together to provide a four output line arrangement, wherein one line will have a plus 15 voltage and the other remaining three will have a plus 5. The condition of the lines sequentially change and this occurs continuously as long as a pulse train is emitted from unit 10.

The binary counters 46 are each provided with two outputs ("1" output and "0" output) with the "1" output comprising a plus 15 voltage and the "0" output constituting a plus 5. The outputs are never identical at any time. The first of the binary counters 46 will change its state when the ring counters 12 have completed a single sequential operation and have commenced a second operation. By the change of state of the first binary counter 46 the output lines are reversed. That is to say, in FIG. 1, the E lines change from a plus 15 to a plus 5 and the F lines change from a plus 5 to a plus 15. It is therefore apparent that the first binary counter 46 will change its state on every fourth pulse.

Each of the binary counters 46 are identical but operate only when the next preceding counter changes state whereby the "0" output again carries a plus 5 voltage and the "1" output carries a plus 15. Therefore, the second binary counter 46 operates on every eighth pulse; the third binary counter 46 operates on every sixteenth pulse and the last binary counter 46 operates on the thirty-second pulse.

It is apparent that in the circuitry as just described I have provided a simplified selective control for the commutator. The ring counter 12 and the binary counter 46 together with the selectively operated manual switches 100—164, all cooperate to determine when a single output (plus 15) is to be transmitted to the output gate 45.

To determine the total number of pulses required to operate a complete cycle of the commutator, the following formulas may be used:

$$P = Nr \times 2N^{(Nb)}$$

In this formula P will equal the total number of pulses making up one complete cycle of the commutator, N represents a bistable element, $r$ equals the total number of bistable elements in the ring counter, $b$ equals the number of bistable elements in the binary counter. Thus, as is described here, there being four bistable elements in the ring, $Nr=4$, and there being four bistable elements in the binary counter $Nb=4$.

Accordingly, since $$P = Nr \times 2N^{(Nb)}$$

Substituting:

$$P = 4 \times 2^{(4)}$$
$$P = 4 \times 16$$
$$P = 64$$

It is evident, however, that by changing any of the number of elements in either the ring counter or by adding additional binary counters, the value of P is increased.

While I have illustrated and described the preferred form of construction for carrying my invention into effect, this is capable of variation and modification without departing from the spirit of the invention. I therefore, do not wish to be limited to the precise details of construction set forth, but desire to avail myself of such variations and modifications as come within the scope of the appended claims.

What is claimed is:

1. An apparatus for selectively commutating sequential electrical pulses to a common output including a matrix having a series of network lines terminating into a common output, an input line for said matrix over which a pulse train is transmitted, means in said input line for interrupting the pulse train and sequentially distributing the pulses thereof in a predetermined value pattern over certain lines of said network, said certain lines serially connected to a plurality of network output lines with said network output lines terminating into the common output including a gate, a plurality of binary counters each having a set of output lines over which passes pulses of different predetermined values, with each output line of each set connected in a predetermined pattern to each of said plurality of network output lines, means in said network lines and said binary counter output lines for combining the pulses of different values transmitted thereover and for determining the value of the pulse to be transmitted to said common output, means for supplying said pulse train directly to said gate, and means in said certain lines for selectively controlling the transmission of pulses over said network output lines.

2. An apparatus for selectively commutating sequential electrical pulses to a common output including a matrix having a series of network lines including in each a diode and terminating into a common output, an input line for said matrix over which a pulse train is transmitted, a ring counter member in said input line for interrupting the pulse train and sequentially distributing the pulses thereof in a predetermined value pattern over certain lines of said network, said certain lines serially connected to a plurality of network output lines with said network output lines terminating into the common output, a plurality of binary counters each having a set of output lines over which passes pulses of different predetermined values, with each output line of each set connected in a predetermined pattern to said plurality of network output lines, means in said network lines and said binary counter output lines for combining the pulses of different values transmitted thereover and for determining the value of the pulse to be transmitted to said common output, means in each of said certain lines for selectively controlling the transmission of pulses over said network output lines, and diode means in each of said certain lines between the last mentioned means and said ring counter member.

3. An apparatus for selectively commutating sequential electrical pulses to a common output including a matrix having a series of network lines terminating into a common output including an output gate, an input line for said matrix over which a pulse train is transmitted, means in said input line for interrupting the pulse train and sequentially distributing the pulses thereof in a predetermined value pattern over certain lines of said network, said certain lines serially connected to a plurality of network output lines with said network output lines terminating into the common output, a plurality of binary counters each having a set of output lines over which passes pulses of different predetermined values, with each output lines of each set connected in a predetermined pattern to said plurality of network output lines, means in said network lines and said binary counter output lines for combining the pulses of different values transmitted thereover and for determining the value of the pulse to be transmitted to said common output, and "on" and "off" switch members in said certain lines for selectively controlling the transmission of pulses over said network output lines and means connected in parallel with said switch members between said output gate and said input line to transmit said pulse train to said output gate.

4. An apparatus for selectively commutating sequential electrical pulses to a common output including a matrix having a series of network lines terminating into a common output, an input line for said matrix over which a pulse train is transmitted, a ring counter member in said input line for interrupting the pulse train and sequentially distributing the pulses thereof in a predetermined value pattern over certain lines of said network, said network including output lines terminating into the common output, said certain lines being greater in number than said output lines and being grouped in parallel in like groups with each group serially connected one each to each of said output lines a plurality of binary counters each having a set of output connections over which passes pulses of different predetermined values, with each output connection of each set connected in a predetermined pattern to said plurality of network output lines, means in said network lines and said binary counter output lines for combining the pulses of different values transmitted thereover and for determining the value of the pulse to be transmitted to said common output including a diode in each of said output lines in said certain lines and in said output connections, and single throw switch members in each of said certain lines connected serially with the diode therein ahead of said output lines for selectively controlling the transmission of pulses over said network output lines.

5. An apparatus for selectively commutating sequential electrical pulses to a common output including a matrix having a series of network lines including in each a diode and terminating into a common output, an input line for said matrix over which a pulse train is transmitted, means in said input line for interrupting the pulse train and sequentially distributing the pulses thereof in a predetermined value pattern over certain lines of said network, said certain lines serially connected to a plurality of network output lines with said network output lines terminating into the common output, a plurality of sequentially operated, interrelated binary counters each having a set of output lines over which passes pulses of different predetermined values, with each output line of each set connected in a predetermined pattern to said plurality of network output lines, means in said network lines and said binary counter output lines for combining the pulses of different values transmitted thereover and for determining the value of the pulse to be transmitted to said common output, and "on" and "off" switch means in each of said certain lines for selectively controlling the transmission of pulses through said certain lines.

6. An apparatus for selectively commutating sequential electrical pulses to a common output including a matrix having a series of network lines terminating into a common output, an input line for said matrix over which a pulse train is transmitted, a ring counter member in said input line for interrupting the pulse train and sequentially distributing the pulses thereof in a predetermined value pattern over certain lines of said network including a diode in each line passing pulses of a predetermined value, said certain lines serially connected to a plurality of network output lines passing said pulses of predetermined value with said network output lines each including a diode terminating into the common output, a plurality of sequentially operated, interrelated binary counters each having a set of output lines over which passes pulses of different predetermined values, with each output line of each set connected in a predetermined pattern to said plurality of network output lines between said spaced diodes, diodes in said binary counter output lines for determining the value of the pulse to be transmitted by said network output lines to said common output, and "on" and "off" switch means in said certain lines for selectively inhibiting transmission of pulses over said network output lines.

7. An apparatus for selectively commutating sequential electrical pulses to a common output including a matrix having a series of network lines terminating into a common output, an input line for said matrix over which a pulse train is transmitted, means in said input line for interrupting the pulse train and sequentially distributing the pulses thereof in a predetermined value pattern over certain lines of said network, said certain lines serially connected to a plurality of network output lines with said network output lines terminating into the common output, a plurality of sequentially operated, interrelated binary counters each having a set of output lines over which passes pulses of different predetermined values, with each output lines of each set connected in a predetermined pattern to said plurality of network output lines, means in said network lines and said binary counter output lines for combining the pulses of different values transmitted thereover and for determining the value of the pulse to be transmitted to said common output including a diode in each of said certain lines and a diode in each of said network output lines, said diodes passing pulses of predetermined value from said interrupting means to said common output, and including a diode in each of said binary counter output lines passing said pulses of predetermined value to said binary counter output lines according to a pattern controlled by said binary counter, and "on" and "off" switch members in said certain lines for selectively inhibiting the transmission of pulses over said network output lines.

8. An apparatus for selectively commutating sequential electrical pulses to a common output including a matrix having a series of network lines terminating into a common output, an input line for said matrix over which a pulse train is transmitted, a ring counter member in said input line for interrupting the pulse train and sequentially distributing the pulses thereof in a predetermined value pattern over certain lines of said network, said certain lines serially connected to a plurality of network output lines with said network output lines terminating into the common output, a plurality of sequentially operated, interrelated binary counters each having a set of output lines over which passes pulses of different predetermined values, with each output line of each set connected in a predetermined pattern to said plurality of network output lines, means in said network lines and said binary counter output lines for combining the pulses of different values transmitted thereover and for determining the value of the pulse to be transmitted to said common output including a diode in each of said certain lines and a diode in each of said network output lines, said diodes passing pulses of predetermined value from said ring counter member to said common output, and including a diode in each of said binary counter output lines passing said pulses of predetermined value to said binary counter output lines according to a pattern controlled by siad binary counter, and switch members in said certain lines for selectively controlling the transmission of pulses over said network output lines.

9. An apparatus for selectively commutating sequential electrical pulses to a common output including a matrix having a series of network lines terminating into a common output, an input line for said matrix over which a pulse train is transmitted, a ring counter member in said input line for interrupting the pulse train and sequentially distributing the pulses thereof in a predetermined value pattern over certain lines of said network, said certain lines serially connected to a plurality of network output lines with said network output lines terminating into the common output, a plurality of binary counters each having a set of output lines over which passes pulses of different predetermined values, with each output line of each set connected in a predetermined pattern to said plurality of network output lines, means cooperating with said ring counter member for transmitting a certain numbered pulse of the pulse train to said plurality of binary counters for sequentially changing the state of each so as to change the value of the pulses passed over each set of binary counter output lines, means in said network lines and said binary counter output lines for combining the pulses of different values transmitted thereover and for determining the value of the pulse to be transmitted to said common output including a diode in each of said certain lines and a diode in each of said network output lines, said diodes passing pulses of predetermined value from said ring counter member to said common output, and including a diode in each of said binary counter output lines passing said pulses of predetermined value to said binary counter output lines according to a pattern controlled by said binary counter, and means in said certain lines for selectively inhibiting the transmission of any or all pulses over said network output lines.

10. An apparatus for selectively commutating sequential electrical pulses to a common output including a matrix having a series of network lines terminating into a common output, an input line for said matrix over which a pulse train is transmitted, an output gate at said common output connected to said input line to receive pulses from said pulse train, a ring counter member in said input line for interrupting the pulse train and sequentially distributing the pulses thereof in a predetermined value pattern over certain lines of said network, said certain lines serially connected to a plurality of network output lines with said network output lines terminating into the common output, a plurality of binary counters each having a set of output lines over which passes pulses of different predetermined values, with each output line of each set connected in a predetermined pattern to said plurality of network output lines, means cooperating with said ring counter member for transmitting a certain numbered pulse of the pulse train to said plurality of binary counters for sequentially changing the state of each so as to change the value of the pulses passed over each set of binary counter output lines, means in said network lines and said binary counter output lines for combining the pulses of different values transmitted thereover and for determining the value of the pulse to be transmitted to said common output including a diode in each of said certain lines and a diode in each of said network output lines, said diodes passing pulses of predetermined value from said ring counter member to said common output, and including a diode in each of said binary counter output lines passing said pulses of predetermined value to said binary counter output lines according to a pattern controlled by said binary counter, and "on" and "off" switch members in said certain lines for selectively controlling the transmission of pulses over said network output lines.

11. An apparatus for selectively commutating sequential electrical pulses to a common output including a matrix having a series of network lines terminating into a common output, an input line for said matrix over which a pulse train is transmitted, a ring counter member in said input line for interrupting the pulse train and sequentially distributing the pulses thereof in a predetermined value pattern over certain lines of said network, said certain lines serially connected to a plurality of network output lines with said network output lines terminating into the common output, a plurality of sequentially operated, interrelated binary counters each having a set of output lines over which passes pulses of different predetermined values, with each output line of each set connected in a predetermined patern to said plurality of network output lines, means cooperating with said ring counter member for transmitting a certain numbered pulse of the pulse train to said plurality of binary counters for sequentially changing the state of each so as to change the value of the pulses passed over each set of binary counter output lines, means in said network lines and said binary counter output lines for combining the pulses of different values transmitted thereover and for determining the value of the pulse to be transmitted to said common output including a diode in each of said certain lines and a diode in each of said network output lines, said diodes passing pulses of predetermined value from said ring counter member to said common output, and including a diode in each of said binary counter output lines passing said pulses of predetermined value to said binary counter output lines according to a pattern controlled by said binary counter, and switch members in said certain lines for selectively inhibiting the transmission of any and all pulses over said network output lines.

12. An apparatus for selectively commutating sequential electrical pulses to a common output including a matrix having a series of network lines terminating into a common output, an input line for said matrix over which a pulse train is transmitted, an output gate in said common output connected to said input line, means in said input line for interrupting the pulse train and sequentially distributing the pulses thereof in a predetermined value pattern over certain lines of said network, said certain lines serially connected to a plurality of network output lines with said network output lines terminating into the common output, a plurality of binary counters each having a set of output lines over which passes pulses of different predetermined values, with each output line of each set connected in a predetermined pattern to said plurality of network output lines, means in said network output lines and said binary counter output lines cooperating to combine like value pulses transmitted thereover into a signal of like values for said common output, and to combine pulses of unlike values into a pulse having a value different from the signal for said common output including a diode in each of said certain lines and a diode in each of said network output lines, said diodes passing pulses of predetermined value from said interrupting means to said common output, and including a diode in each of said binary counter output lines passing said pulses of predetermined value to said binary counter output lines according to a pattern controlled by said binary counter, and means in said certain lines for selectively inhibiting the transmission of pulses to said network output lines.

13. An apparatus for selectively commutating sequential electrical pulses to a common output including a matrix having a series of network lines terminating into a common output, an input line for said matrix over which a pulse train is transmitted, a ring counter member in said input line for interrupting the pulse train and sequentially distributing the pulses thereof in a predetermined value pattern over certain lines of said network, said certain lines serially connected to a plurality of network output lines with said network output lines terminating into the common output, a plurality of binary counters each having a set of output lines over which passes pulses of different predetermined values, with each output line of each set connected in a predetermined pattern to said plurality of network output lines, means in said network output lines and said binary counter output lines cooperating to combine like value pulses transmitted thereover into a signal of like values for said common output and to combine pulses of unlike values into a pulse having a value different from the signal for said common output including a diode in each of said certain lines and a diode in each of said network output lines, said diodes passing pulses of predetermined value from said ring counter member to said common output, and including a diode in each of said binary counter output lines passing said pulses of predetermined value to said binary counter output lines according to a pattern controlled by said binary counter, and "on" and "off" switch members in said certain lines for selectively controlling the transmission of pulses over said network output lines.

14. An apparatus for selectively commutating sequential electrical pulses to a common output including a matrix having a series of network lines terminating into a common output, an input line for said matrix over which a pulse train is transmitted, a ring counter member in said input line for interrupting the pulse train and sequentially distributing the pulses thereof in a predetermined value pattern over certain lines of said network, said certain lines serially connected to a plurality of network output lines with said network output lines terminating into the common output, a plurality of sequentially operated, interrelated binary counters each having a set of output lines over which passes pulses of different predetermined values, with each output line of each set connected in a predetermined pattern to said plurality of network output lines, means in said network output lines and said binary counter output lines cooperating to combine like value pulses transmitted thereover into a signal of like values for said common output, and to combine pulses of unlike values into a pulse having a value different from the signal for said common output including a diode in each of said certain lines and a diode in each of said network output lines, said diodes passing pulses of predetermined value from said ring counter member to said common output, and including a diode in each of said binary counter output lines passing said pulses of predetermined value to said binary counter output lines according to a pattern controlled by said binary counter, and "on" and "off" switch members in said certain lines for selectively controlling the transmission of pulses over said network output lines.

15. An apparatus for selectively commutating sequential electrical pulses to a common output including a matrix having a series of network lines terminating into a common output, an input line for said matrix over which a pulse train is transmitted, an output gate means in said common output connected to said input line, a ring counter member in said input line for interrupting the pulse train and sequentially distributing the pulses thereof in a predetermined value pattern over certain lines of said network, said certain lines serially connected to a plurality of network output lines with said network output lines terminating into the common output, a plurality of sequentially operated, interrelated binary counters each having a set of output lines over which passes pulses of different predetermined values, with each output line of each set connected in a predetermined pattern to said plurality of network output lines, means cooperating with said ring counter member for transmitting a certain numbered pulse of the pulse train to said plurality of binary counters for sequentially changing the state of each so as to change the value of the pulses passed over each set of binary counter output lines, means in said network output lines and said binary counter output lines cooperating to combine like value pulses transmitted thereover into a signal of like values for said common output including an independent switch means in each of said certain lines and a diode in each of said network output lines, said diode passing pulses of a predetermined value to said common output, and including a diode in each of said binary output lines for passing pulses of a predetermined value to said output lines according to a pattern controlled by said binary counters, and to combine pulses of unlike values into a pulse having a value different from the signal for said common output.

References Cited in the file of this patent

UNITED STATES PATENTS

| | | |
|---|---|---|
| 2,136,441 | Karolus | Nov. 15, 1938 |
| 2,570,716 | Rochester | Oct. 9, 1951 |
| 2,686,299 | Eckert | Aug. 10, 1954 |
| 2,845,617 | Turvey | July 29, 1958 |
| 2,862,660 | Purcell | Dec. 2, 1958 |
| 2,992,410 | Groth et al. | July 11, 1961 |